United States Patent Office 3,583,992
Patented June 8, 1971

3,583,992
1-METHYL-D-LYSERGIC ACID-DIHYDROXY-
ALKYL-AMIDES
Albert Hofmann and Franz Troxler, Bottmingen, Switzerland, assignors to Sandoz Ltd., also known as Sandoz AG, Basel, Switzerland
No Drawing. Continuation-in-part of abandoned application Ser. No. 480,875, Aug. 18, 1965. This application Jan. 30, 1968, Ser. No. 701,558
Claims priority, application Switzerland, Sept. 15, 1964, 11,958/64; July 5, 1965, 9,380/65
Int. Cl. C07d 43/20
U.S. Cl. 260—285.5                                      6 Claims

ABSTRACT OF THE DISCLOSURE

The invention provides 1-methyl-d-lysergic acid or 1-methyl-9,10-dihydro-d-lysergic acid amines of general Formula I

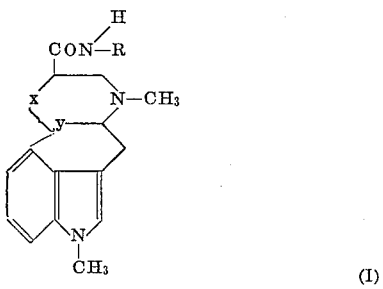

in which R signifies an alkyl radical of from 3 to 8 carbon atoms inclusive substituted by two hydroxy radicals, and $x \frown y$ signifies the radical

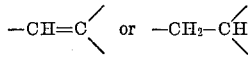

and their acid addition salts.

The compounds are indicated for use in the chronic interval treatment of vascular headaches, e.g. migraine.

———

This is a continuation-in-part application of application Ser. No. 480,785 filed on Aug. 18, 1965, now abandoned.

The present invention relates to new heterocyclic compounds and a process for their production.

The invention provides 1-methyl-d-lysergic acid or 1-methyl-9,10-dihydro-d-lysergic acid amides of general Formula I,

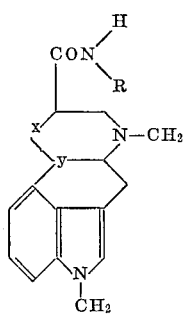

in which R signifies an alkyl radical of from 3 to 8 carbon atoms inclusive substituted by two hydroxy radicals, and $x \frown y$ signifies the radical

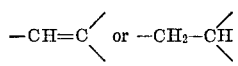

and their acid addition salts.

The present invention further provides a process for the production of compounds I and their acid addition salts, characterized in that a reactive derivative of 1-methyl-d-lysergic acid or 1-methyl-d-isolysergic acid or 1-methyl-9,10-dihydro-d-lysergic acid is reacted with an amine of general Formula II, $$NH_2-R \qquad (II)$$

in which R has the above significance, and the resulting compound I is then optionally converted into its acid addition salts.

Reactive derivatives which may be used in the process of the invention are the azides, the acid chloride hydrochlorides or the mixed anhydrides of sulphuric acid with 1-methyl-d-lysergic acid or 1-methyl-9,10-dihydro-d-lysergic acid and 1-methyl-d-isolysergic acid azide.

Examples of amines II which may be used are as follows: 1,3-dihydroxy-propylamine-(2) [serinol], 1,4-dihydroxy-butylamine - (2) [L-asparaginol], 1,5 - dihydroxy-pentylamine-(2) [L-glutaminol] and 1,3-dihydroxy-2-methyl-propylamine-(2).

The optically active bivalent amino alcohols belong to the L series.

The reaction of the azide of 1-methyl-d-lysergic acid or 1-methyl-d-isolysergic acid or 1-methyl-9,10-dihydro-d-lysergic acid with an amine II is advantageously effected as follows:

An excess of an amine II (at least 2 mols) is added to a solution, produced in manner known per se, of 1-methyl-d-lysergic acid azide, 1-methyl-d-isolysergic acid azide or 1-methyl-9,10-dihydro-d-lysergic acid azide in an inert organic solvent, preferably at a temperature of 0–5° C., and the reaction mixture is allowed to stand for several hours at room temperature. Other acid binding agents may be used in place of an excess of amine; thus, for example, the use of a suspension of potassium carbonate in a mixture of the amine with isopropanol and absolute ether has been found to be advantageous. The working up of the reaction mixture and the isolation of compound I are advantageously effected by methods used for the amides of lysergic acid, e.g. chromatography, crystallization and/or purification via the salts with organic or inorganic acids.

A mixture of the amides of 1-methyl-d-lysergic acid and 1-methyl-d-isolysergic acid is always obtained from 1-methyl-d-lysergic acid azide or 1-methyl-d-isolysergic acid azide. The undesired amides of 1-methyl-d-isolysergic acid may be transposed in manner known per se until an equilibrium is obtained to the corresponding amides of 1-methyl-d-lysergic acid, e.g. by letting stand in dilute acids or in an alkaline medium at room temperature or at a slightly elevated temperature.

The production of compounds I by reaction of a mixed anhydride of sulphuric acid and 1-methyl-d-lysergic acid or 1-methyl-9,10-dihydro-d-lysergic acid with an amine II may, for example, be effected as follows:

3 to 5 mols of an amine II, which may suitably be diluted with an inert organic solvent, are added to a solution prepared in manner known per se of the above-mentioned mixed anhydride in the same solvent. For the purposes of working up, the resulting complex is decomposed at a low temperature by the addition of water and compound I is isolated from the resulting reaction mixture and purified in manner known per se, e.g. by extraction, chromatography and/or crystallization.

In a further embodiment of the present invention compounds I are produced in that an acid chloride hydrochloride of 1-methyl-d-lysergic acid or 1-methyl-9,10-dihydro-d-lysergic acid is reacted with the corresponding amine II in an organic solvent. This process is advantageously effected in that the acid chloride hydrochloride in absolute chloroform, methylene chloride, carbon disulphide or a mixture of these solvents is suspended in tert.butanol and an excess (at least 2 mols) of the amine component, which may optionally be dissolved in an organic solvent, is added, preferably at a temperature of 0–5° C. A tertiary amine, e.g. pyridine or triethylamine, may also be used as acid binding agent in place of an excess of the amine II. The reaction solution is subsequently diluted with water and the amide is extracted with a water immiscible solvent. After evaporation of the solvent the desired amide crystallizes as the free base from the evaporation residue or is purified by chromatography and/or crystallization or is isolated as the salt of an organic or inorganic acid.

Compounds I may subsequently be converted into their acid addition salts by reaction with organic or inorganic acids in manner known per se. Examples of acids which may be used for acid addition salt formation with compounds I are: hydrochloric, hydrobromic, sulphuric, phosphoric, fumaric, maleic, malic, acetic and tartaric acid.

The compounds of the general Formula I are characterized by a strong serotonin antagonistic activity in vitro and in vivo and by a certain constrictive effect on the smooth vascular muscles. They are indicated for usein the chronic interval treatment of vascular headaches, e.g. migraine.

The compounds I may be administered in the same manner as 1-methyl-lysergic acid-1'-hydroxy-butylamide-2'- available under the trademark Sansert, except that because of the comparatively greater strength of the present compounds, they may be administered at a somewhat lower dosage. The compounds I may be given in tablet form, a suitable daily dosage being 0.5 to 8 mg.

The compounds of the invention may be used as pharmaceuticals on their own or in the form of appropriate medicinal preparations for administration, e.g. enterally or parenterally. In order to produce suitable medicinal preparations the compounds are worked up with organic or inorganic adjuvants which are inert and physiologically acceptable. Examples of such adjuvants are as follows:

tablets and dragées: lactose, starch, talc and stearic acid;
syrups: solutions of cane sugar, invert sugar and glucose;
injectable solutions: water, alcohols, glycerin and vegetable oils;
suppositories: natural or hardened oils and waxes.

The preparations may furthermore contain suitable preserving, stabilizing and wetting agents, solubilizers, sweetening and coloring substances or flavorings.

The term "in manner known per se" as utilized herein designates methods in use or described in the literature on the subject.

In the following non-limitative examples all temperatures are indicated in degrees centigrade. The melting points are corrected.

EXAMPLE 1

1-methyl-d-lysergic acid 1',3'-dihydroxypropyl-amide-(2')

11 g. of 1,3-dihydroxy-propylamine-(2) dissolved in 50 ml. of dimethyl sulphoxide are added whilst stirring to a suspension cooled to 0° of 7 g. of 1-methyl-d-lysergic acid chloride hydrochloride in 400 ml. of methylene chloride, stirring is effected for a further half hour without cooling, shaking out is then effected between a dilute soda solution and chloroform and the organic phase which has been dried over potassium carbonate is evaporated to dryness in a vacuum. The crude product is chromatographed on a column of aluminium oxide, whereby the desired compound is washed into the filtrate with chloroform containing 3–4% of alcohol. The amorphous base is subsequently converted into its bimaleate.

Bimaleate: melting point 180–182°, $[\alpha]_D^{20} = +44°$ (c.=0.5 in 50% ethanol). Keller's colour reaction: blue.

EXAMPLE 2

1-methyl-9,10-dihydro-d-lysergice acid 1',3'-dihydroxypropyl-amide-(2')

A solution of 4.27 g. of 1,3-dihydroxypropylamine-(2) (serinol) in 100 ml. of methylene chloride is added whilst stirring at a temperature of 2° to a suspension of 5.25 g. of 1-methyl-9,10-dihydro-d-lysergic acid chloride hydrochloride in 200 ml. of methylene chloride. Stirring is effected for a further hour at room temperature and shaking out is then effected between an aqueous soda solution and methylene chloride. The organic phase which has been dried over potassium carbonate is evaporated to dryness in a vacuum and the evaporation residue is chromatographed on a column of 130 g. of aluminium oxide. By-products are washed into the filtrate with chloroform containing 2% of alcohol and then the compound mentioned in the heading with chloroform containing 4–8% of alcohol. The compound crystallizes from a mixture of methylene chloride/methanol/ethyl acetate in the form of needles having a melting point of 225–226°, $[\alpha]_D^{20} = -132°$ (c.=0.5 in pyridine).

The 1-methyl-9,10-dihydro-d-lysergic acid chloride hydrochloride used as starting material may, for example, be produced as follows:

9.7 ml. of phosphorus trichloride are added dropwise at 0–2° to 31 ml. of absolute tetrahydrofuran and then 16.2 ml. of absolute chloroform are added dropwise at the same temperature. Cooling is again effected to 2°, 5.7 g. of 1-methyl-9,10-dihydro-d-lysergic acid are added, washing is effected with 15 ml. of chloroform and cooling is again effected to 0–2°. A solution of 5.01 g. of phosphorous pentachloride in 52 ml. of phosphorous trichloride is added dropwise at the same temperature whilst stirring vigorously and stirring is effected for a further 5 hours at room temperature. After the addition of 250 ml. of absolute petroleum ether filtration is effected, the precipitate is washed thoroughly with petroleum ether and is dried in a vacuum at 40° for one hour.

EXAMPLE 3

1-methyl-d-lysergic acid 1',4'-dihydroxybutyl-amide-(2')

10 ml. of a N aqueous sodium nitrite solution are added to a solution of 2.96 g. of 1-methyl-d-isolysergic acid hydrazide in 100 ml. of 0.1 N hydrochloric acid and 15 ml. of N hydrochloric acid are added dropwise whilst stirring at 2–5°. Stirring is effected for a further 15 minutes at a temperature not higher than 5°, shaking out is then effected between a dilute aqueous sodium bicarbonate solution and a total of 2 litres of ether whilst cooling with ice, the ether phase is dried 3 times over potassium carbonate and is poured into a vigorously stirred suspension of 5 g. of potassium carbonate in 100 ml. of ether which contains a solution of 1.8 g. of 1,4-dihydroxy-butylamine-(2) (L-asparaginol) in 100 ml. of isopropanol. Stirring is effected for a further 4 hours without cooling, shaking out is then effected with water, the aqueous phase is washed twice with chloroform and the combined organic phases are dried over potassium carbonate. The crude product obtained by evaporation of the solvent is chromatographed on 80 g. of aluminium oxide, whereby 1-methyl-d-isolysergic acid 1',4'-dihydroxy-butyl-amide-(2') is washed into the filtrate with chloroform containing 1–2% of alcohol and then 1-methyl-d-lysergic acid 1',4'-dihydroxy-butyl-amide-(2') with chloroform contaniing 4–5% of alcohol. The first named compound may be transposed to the latter compound until a balance is obtained at approximately 50:50%. This is effected, for example, as follows:

A solution of 1 ml. of 86% $H_3PO_4$ in 10 ml. of absolute methanol is added to a solution of 600 mg. of isolysergic acid compound in 70 ml. of absolute methanol and the mixture is heated to 50° for 5 days. Shaking out is then effected between a dilute aqueous soda solution and chloroform and the mixture of lysergic acid and isolysergic acid compound obtained by evaporation of the organic phase which has been dried is separated by chromatography on aluminium oxide. The bimaleate of 1-methyl-d-lysergic acid 1',4'-dihydroxy-butyl-amide-(2') crystallizes from acetone in needles having a melting point of 167–168°. $[\alpha]_D^{20} = +26°$ (c.=0.5 in water).

EXAMPLE 4

1-methyl-d-lysergic acid 1',5'-dihydroxy-pentyl-amide-(2')

The compound mentioned in the heading is obtained from 1-methyl-d-isolysergic acid hydrazide and 1,5-dihydroxy-pentylamine-(2) (L-glutaminol) in a manner analogous to that described in Example 3. The bimaleate crystallizes from acetone in needles having a melting point of 170–175°, $[\alpha]_D^{20} = +23°$ (c.=0.3 in water).

EXAMPLE 5

1-methyl-d-lysergic acid 1',3'-dihydroxy-2'-methyl-propyl-amide-(2')

The compound mentioned in the heading is obtained from 1-methyl-d-lysergic acid hydrazide and 1,3-dihydroxy-2-methyl-propylamine-(2) in a manner analogous to that described in Example 3. The bimaleate crystallizes from acetone in needles having a melting point of 173°, $[\alpha]_D^{20} = +49°$ (c.=0.5 in water).

EXAMPLE 6

1-methyl-d-lysergic acid 1',3'-dihydroxypropyl-amide-(2)

0.9 g. of 1-methyl-d-lysergic acid and 88 mg. of 89% lithium hydroxide are dissolved while shaking in 150 cc. of methanol, the solution is filtered through talcum, the filtrate is evaporated to dryness and the dry residue is heated to 80° in a high vacuum for a further 2 hours. The dry lithium salt of 1-methyl-d-lysergic acid is then dissolved in 30 cc. of dimethyl formamide and a solution of 510 mg. of sulphur trioxide in 5 cc. of dimethyl formamide is added to the solution at 0°. The mixture is kept at 0° for 10 minutes, is then cooled to −10°, 1.42 g. of 1,3-dihydroxypropylamine-(2) are added and the mixture is kept at −10° for a further 10 minutes. The sulphur trioxide complex is decomposed by adding 250 cc. of water at −60° and shaking out with chloroform. The crude product obtained after concentrating the dried chloroform phase by evaporation is chromatographed on a column of aluminium oxide, whereby the desired compound is washed into the filtrate with chloroform containing 3–4% of alcohol. The amorphous base is subsequently converted into its bimaleate.

Bimaleate: melting point 180–182°. $[\alpha]_D^{20} = +44°$ (c.=0.5 in 50% ethanol). Keller's colour reaction: blue.

What is claimed is:
1. A d-lysergic acid derivative of the formula:

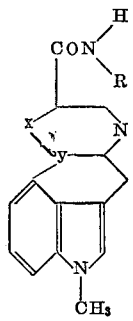

in which R is alkyl of 3 to 8 carbon atoms inclusive substituted by two hydroxy radicals, and $\overset{\frown}{x\ y}$ is

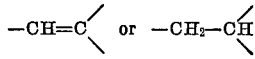

and pharmaceutically acceptable acid addition salts thereof.

2. 1-methyl - d - lysergic acid 1',3'-dihydroxy-propyl-amide-(2').

3. 1-methyl-9,10-dihydro - d - lysergic acid 1',3'-dihydroxy-propyl-amide-(2').

4. 1-methyl-d-lysergic acid 1',4'-dihydroxy-butyl-amide-(2').

5. 1-methyl - d - lysergic acid 1',5'-dihydroxy-pentyl-amide-(2').

6. 1-methyl - d - lysergic acid 1',3'-dihydroxy-2'-methyl-propyl-amide-(2').

References Cited

UNITED STATES PATENTS

| | | | |
|---|---|---|---|
| 2,997,470 | 8/1961 | Pioch | 260—285.5 |
| 3,113,133 | 12/1963 | Hofmann et al. | 260—285.5 |
| 3,272,823 | 9/1966 | Arcamone et al. | 260—285.5 |
| 3,346,580 | 10/1967 | Hofmann et al. | 260—285.5 |

FOREIGN PATENTS

| | | | |
|---|---|---|---|
| 448,117 | 3/1968 | Switzerland | 260—285.5 |

OTHER REFERENCES

Chem. Abstracts, vol. 68, patent author index p. 70(p) (1968).

DONALD G. DAUS, Primary Examiner

U.S. Cl. X.R.

424—261